(12) United States Patent
Madaan et al.

(10) Patent No.: US 11,650,965 B2
(45) Date of Patent: May 16, 2023

(54) SYSTEMS AND METHODS FOR EFFICIENTLY MAINTAINING RECORDS IN A CLOUD-BASED SYSTEM

(71) Applicant: Zscaler, Inc., San Jose, CA (US)

(72) Inventors: Raman Madaan, Chandigarh (IN); Kumar Gaurav, Cupertino, CA (US); Chakkaravarthy Periyasamy Balaiah, Sunnyvale, CA (US); Kailash Kailash, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 343 days.

(21) Appl. No.: 16/851,161

(22) Filed: Apr. 17, 2020

(65) Prior Publication Data

US 2021/0279216 A1    Sep. 9, 2021

(30) Foreign Application Priority Data

Mar. 5, 2020   (IN) .............................. 202011009412

(51) Int. Cl.
| | | |
|---|---|---|
| *G06F 16/00* | (2019.01) | |
| *G06F 16/21* | (2019.01) | |
| *G06N 20/00* | (2019.01) | |
| *G06F 16/2458* | (2019.01) | |
| *G06Q 50/26* | (2012.01) | |

(52) U.S. Cl.
CPC ........ *G06F 16/217* (2019.01); *G06F 16/2462* (2019.01); *G06N 20/00* (2019.01); *G06Q 50/265* (2013.01)

(58) Field of Classification Search
None
See application file for complete search history.

(56) References Cited

U.S. PATENT DOCUMENTS

| | | | | |
|---|---|---|---|---|
| 5,796,939 | A * | 8/1998 | Berc | G06F 11/3495 |
| | | | | 714/45 |
| 8,429,111 | B1 | 4/2013 | Kaillash et al. | |
| 9,533,096 | B2 * | 1/2017 | Lebel | G06F 3/0673 |
| 9,760,283 | B2 | 9/2017 | Kalipatnapu et al. | |
| 9,904,637 | B2 * | 2/2018 | Sengoku | G06F 13/3625 |
| 9,912,638 | B2 * | 3/2018 | Kailash | H04L 63/1425 |

(Continued)

OTHER PUBLICATIONS

Cloud-Based Driver Monitoring System Using a Smartphone, Kasheher et al., (Year: 2020).*

(Continued)

*Primary Examiner* — Jean M Corrielus
(74) *Attorney, Agent, or Firm* — Baratta Law PLLC; Lawrence A. Baratta, Jr.

(57) ABSTRACT

Systems and methods include obtaining statistics based on monitoring in a cloud-based system for a given time period; and, responsive to determining an arrangement of counters for N counters, storing each of M counters for the given time period as a plurality of records with each record including a record type, a possible offset to a next record in terms of a counter identifier (ID), and a counter value, wherein N and M are integers and M<<N, and wherein the arrangement is determined such that most frequently used counters occupy lower counter IDs. The systems and methods can further include updating the arrangement of the counters for the N counters, to perform an optimization such that the most frequently used counters occupy lower counter IDs.

20 Claims, 4 Drawing Sheets

(56) References Cited

U.S. PATENT DOCUMENTS

| | | | | |
|---|---|---|---|---|
| 10,768,841 | B2* | 9/2020 | Cornett | H03M 7/40 |
| 11,277,424 | B2* | 3/2022 | Wang | H04L 63/1425 |
| 2015/0163199 | A1* | 6/2015 | Kailash | H04L 63/1425 |
| | | | | 726/11 |
| 2016/0364465 | A1* | 12/2016 | Sang | H04L 63/1408 |
| 2017/0090760 | A1* | 3/2017 | Kalipatnapu | G06F 3/0604 |
| 2017/0195413 | A1* | 7/2017 | Teja | H04L 67/306 |
| 2018/0152366 | A1* | 5/2018 | Cornett | G06F 8/65 |
| 2019/0303773 | A1* | 10/2019 | Kuan | G06Q 10/04 |
| 2020/0287922 | A1* | 9/2020 | Wang | H04L 63/1416 |

OTHER PUBLICATIONS

Cloud-based driver monitoring and vehicle diagnostic with OBD2 telematics, Amarasinger et al., (Year: 2015).*

A Cloud-based Architecture for the Internet of Things targeting Industrial Devices Remote Monitoring and Control, Silva et al., (Year: 2016).*

* cited by examiner

SYSTEMS AND METHODS FOR EFFICIENTLY MAINTAINING RECORDS IN A CLOUD-BASED SYSTEM

FIELD OF THE DISCLOSURE

The present disclosure relates generally to networking and computing. More particularly, the present disclosure relates to systems and methods for efficiently maintaining records in a cloud-based system.

BACKGROUND OF THE DISCLOSURE

Enterprises are moving their Information Technology (IT) infrastructure to the cloud. For example, three example cloud services include Zscaler Internet Access (ZIA), Zscaler Private Access (ZPA), and Zscaler Digital Experience (ZDX), from Zscaler, Inc. (the assignee/applicant of the present application). The ZIA service can include firewall, threat prevention, Deep Packet Inspection (DPI), Data Leakage Prevention (DLP), policy enforcement, and the like. That is, ZIA can provide cloud-based security, regardless of device type, location, network, etc. The ZPA can include access control, microservice segmentation, etc. For example, the ZIA service can provide a user with secure Internet Access, and the ZPA service can provide a user with access to enterprise resources in lieu of traditional Virtual Private Networks (VPNs). The ZDX service can provide monitoring and improving user experience. Of course, there are various other types of services, and all such services are contemplated herein.

A key aspect of cloud services includes monitoring, logging, storing, and querying statistics associated with the operation of cloud services. For example, the operation of ZIA, ZPA, and/or ZDX can include a large number of users performing a large number of operations, transactions, etc., each of which is monitored, logged, and stored, and later queried for a variety of purposes. Such statistics can require several thousand variables ranging from hardware, peripheral, network, operating system, memory, process variables indicating errors, exceptions, and events such as virus-detection counts and content classification counts. These variables are sampled over small sampling periods for logging purposes. Logging this statistical data can create an extremely large data collection. For example, a system that logs millions of transactions per second generates log record data that are too large to store or transmit efficiently. Assuming four bytes of information per variable, and 5,000 variables sampled every second, the bandwidth requirement for statistics transmission alone is 160 Kbps.

Commonly-assigned U.S. Pat. No. 8,429,111, issued Apr. 23, 2013, and entitled "Encoding and compression of statistical data," the contents of which are incorporated herein by reference, describes compression techniques for storing such logs. Compression improves the size of log data, but as the features and users of cloud services expand, compressed logs are still unreasonably large. Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage.

There is a need to further efficiently store and compress such logs.

BRIEF SUMMARY OF THE DISCLOSURE

The present disclosure relates to systems and methods for efficiently maintaining records in a cloud-based system. A compressed statistic (referred to herein as a "cstat") record is used in a backend data store for queries. A cstat record is a collection of tens of thousands of counters. A counter can be a tuple of an identifier (ID) and value. As described herein, a counter represents some monitored data associated with the cloud-based system. The objective of the present disclosure is to efficiently compress the cstat records that are a group of a large number of counters that are sparsely populated (e.g., tens of thousands of counters or more). For example, a cstat record can be stored every time period (e.g., an hour or any other time interval) in the cloud-based system. There can be millions of active users or more. Further, the cstat record grows as the cloud-based system adds new features, and there are more cstat records as the number of users increases. The benefits of reducing the cstat record size include 1) reports would be served faster due to a faster decompression rate, 2) more counters can be stored in memory cache, and 3) reducing the disk space.

In an embodiment, a method and a non-transitory computer-readable storage medium includes computer-readable code stored thereon for programming a processor to perform steps of obtaining statistics based on monitoring in a cloud-based system for a given time period; and, responsive to determining an arrangement of counters for N counters, storing each of M counters for the given time period as a plurality of records with each record including a record type, a possible offset to a next record in terms of a counter identifier (ID), and a counter value, wherein N and M are integers and M<<N, and wherein the arrangement is determined such that most frequently used counters occupy lower counter IDs. The steps can further include updating the arrangement of the counters for the N counters, to perform an optimization such that the most frequently used counters occupy lower counter IDs. The updating can be based on historical data and machine learning.

The arrangement can be further determined such that counters in the N counters frequently used together are subsequent to one another. The possible offset can be omitted when a record has a counter ID subsequent to a previous record's counter ID. The record type can be a fixed value that determines a size and range of the possible offset and a value or value range of the counter value. The possible offset can be one of 1 or a value specified in bits of a record, based on the record type. N can be on an order of tens of thousands and M is several orders of magnitude less than N.

In a further embodiment, a server includes a network interface communicatively coupled to a network; a processor communicatively coupled to the network interface; and memory storing computer-executable instructions that, when executed, cause the processor to obtain statistics based on monitoring in a cloud-based system for a given time period; and, responsive to a determination of an arrangement of counters for N counters, store each of M counters for the given time period as a plurality of records with each record including a record type, a possible offset to a next record in terms of a counter identifier (ID), and a counter value, wherein N and M are integers and M<<N, and wherein the arrangement is determined such that most frequently used counters occupy lower counter IDs.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

DETAILED DESCRIPTION OF THE DISCLOSURE

Again, the present disclosure relates to systems and methods for efficiently maintaining statistics and logs in a cloud-based system. A compressed statistic (referred to herein as a "cstat") record is used in a backend data store for queries. A cstat record is a collection of tens of thousands of counters. A counter can be a tuple of an identifier (ID) and value. As described herein, a counter represents some monitored data associated with the cloud-based system. The objective of the present disclosure is to efficiently compress the cstat records that are a group of a large number of counters that are sparsely populated (e.g., tens of thousands of counters or more). For example, a cstat record can be stored every time period (e.g., an hour or any other time interval) in the cloud-based system. There can be millions of active users or more. Further, the cstat record grows as the cloud-based system adds new features, and there are more cstat records as the number of users increases. The benefits of reducing the cstat record size include 1) reports would be served faster due to a faster decompression rate, 2) more counters can be stored in memory cache, and 3) reducing the disk space.

Example Cloud System Architecture

Figure 1:
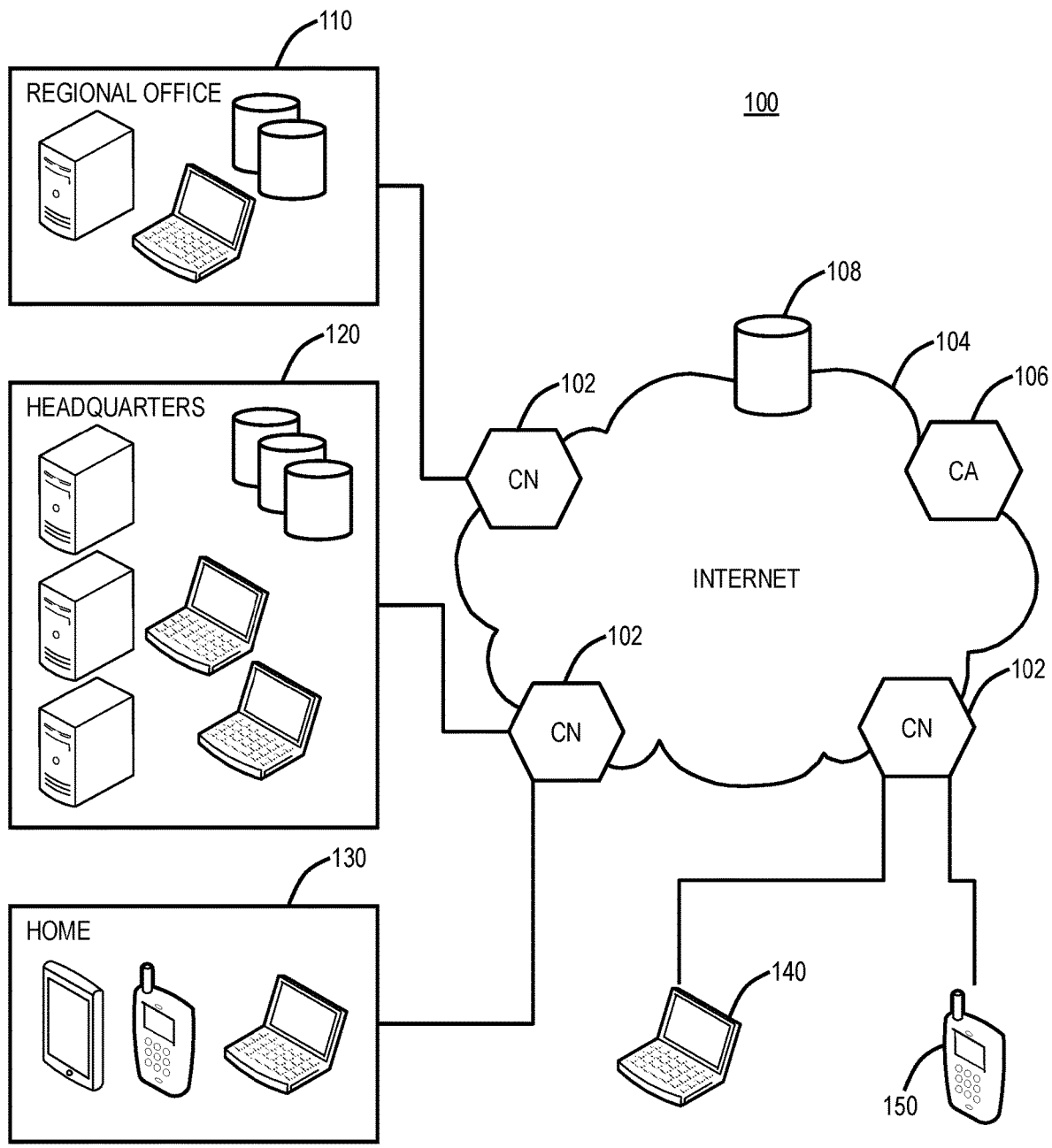
FIG. 1 is a network diagram of a cloud-based system for implementing various cloud-based services.
Figure 2:
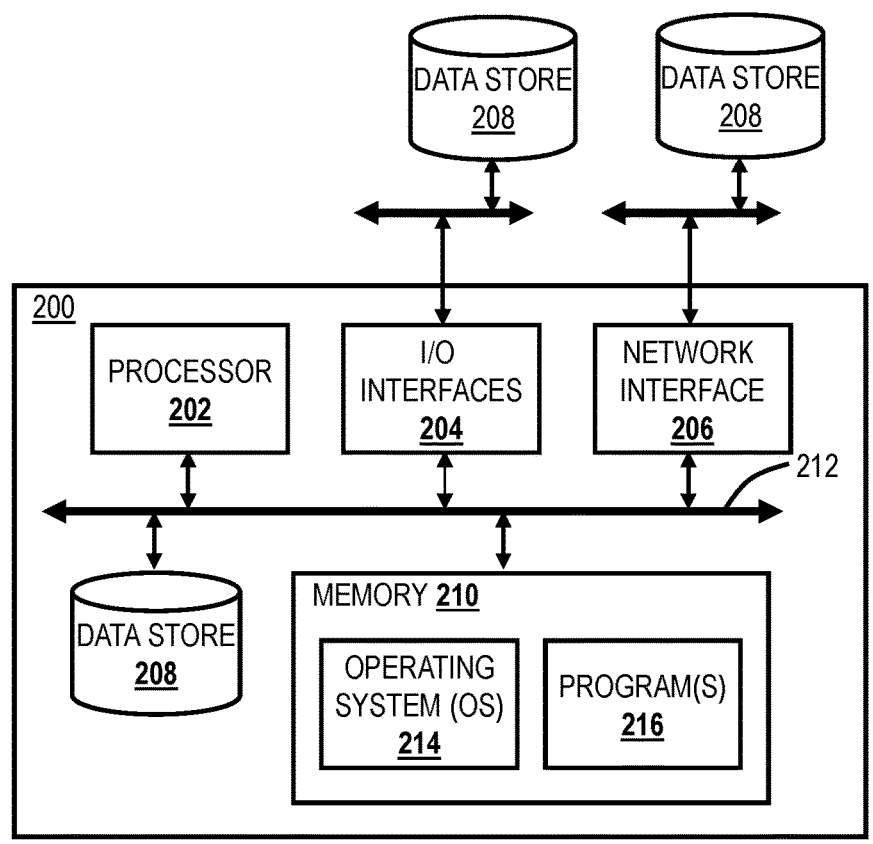

FIG. 1 is a network diagram of a cloud-based system 100 for implementing various cloud-based services. The cloud-based system 100 includes one or more Cloud Nodes (CN) 102 communicatively coupled to the Internet 104 or the like. The cloud nodes 102 may be implemented as a server 200 (as illustrated in FIG. 2) or the like and can be geographically diverse from one another, such as located at various data centers around the country or globe. Further, the cloud-based system 100 can include one or more Central Authority (CA) nodes 106 and one or more logging nodes 108, which similarly can be implemented as the server 200 and be connected to the cloud nodes 102. For illustration purposes, the cloud-based system 100 can connect to a regional office 110, headquarters 120, various employee's homes 130, laptops/desktops 140, and mobile devices 150, each of which can be communicatively coupled to one of the cloud nodes 102. These locations 110, 120, 130, and devices 140, 150 are shown for illustrative purposes, and those skilled in the art will recognize there are various access scenarios to the cloud-based system 100, all of which are contemplated herein. The devices 140, 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services such as Software as a Service (SaaS), platform as a service, infrastructure as a service, security as a service, Virtual Network Functions (VNFs) in a Network Functions Virtualization (NFV) Infrastructure (NFVI), etc. to the locations 110, 120, 130 and devices 140, 150. Previously, the Information Technology (IT) deployment model included enterprise resources and applications stored within an enterprise network (i.e., physical devices), behind a firewall, accessible by employees on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored via redirection, a proxy, traffic forwarding, etc. to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, Uniform Resource Locator (URL) filtering, antivirus protection, bandwidth control, DLP, zero-day vulnerability protection, web 2.0 features, and the like. In an embodiment, the cloud-based system 100 may be viewed as security as a service through the cloud. For example, the cloud-based system 100 can be used to block or allow access to web sites, implement policy, protect against malware, provide Data Leakage Prevention (DLP), etc.

That is, the cloud-based system 100 can be configured to provide device security and policy systems and methods. The laptops/desktops 140, the mobile device 150, as well as various devices at the locations 110, 120, 130 may include common devices such as laptops, smartphones, tablets, netbooks, personal digital assistants, MP3 players, cell phones, e-book readers, Internet of Things (IoT) devices, and the like. The cloud-based system 100 can be configured to provide security and policy enforcement for devices. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up to date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users, which is dynamically available at the cloud nodes 102, etc.

The cloud nodes 102 can proactively detect and preclude the distribution of security threats, e.g., malware, spyware, viruses, email spam, Data Leakage Prevention (DLP), content filtering, etc., and other undesirable content sent from or requested by the user device 300. The cloud nodes 102 can also log activity and enforce policies, including logging changes to the various components and settings. The cloud nodes 102 can be communicatively coupled to the user devices 300, providing in-line monitoring. The connectivity between the cloud nodes 102 and the user devices 300 may be via a tunnel (e.g., using various tunneling protocols such as Generic Routing Encapsulation (GRE), Layer Two Tunneling Protocol (L2TP), or other Internet Protocol (IP) security protocols may be used. Alternatively, the connectivity may be via a user application on the user device 300 that is configured to forward traffic in conjunction with the cloud nodes 102. The central authority nodes 106 can store policy data for each organization and can distribute the policy data to each of the cloud nodes 102. The central authority nodes 106 can also distribute threat data that includes the classifications of content items according to threat classifications, e.g., a list of known viruses, a list of known malware sites, spam email domains, a list of known phishing sites, a DLP dictionary, etc. The conventional deployment relied on physical devices located at the perimeter of the enterprise network. The cloud-based system 100 removes the need for such devices as well as the management thereof and provides security anywhere, anytime, on any system.

The logging nodes 108 functionally provide statistics storage and retrieval. The logging nodes 108 can be separate hardware devices as well as components in the cloud nodes 102. Functionally, the logging nodes 108 are configured to store the cstat records. That is, the logging nodes 108 store data related to the operation of the cloud nodes 102. The logging nodes 108 can include a data store, i.e., memory, for storing the cstat records. Further, the logging nodes 108 can include a front end for a user to perform queries of the stored cstat records. In an embodiment, the systems and methods described herein relate to improvements for storing the cstat records in memory at the logging nodes 108.

As described herein, the terms cloud services and cloud applications may be used interchangeably. A cloud service is any service made available to users on-demand via the Internet, such as via the cloud-based system 100 as opposed to being provided from a company's own on-premises servers. A cloud application, or cloud app, is a software program where cloud-based and local components work together. Two example cloud services include Zscaler Internet Access (ZIA) and Zscaler Private Access (ZPA), from Zscaler, Inc. (the assignee and applicant of the present application). The ZIA service can include firewall, threat prevention, Deep Packet Inspection (DPI), Data Leakage Prevention (DLP), and the like. The ZPA can include access control, microservice segmentation, etc. For example, the ZIA service can provide a user with Internet Access, and the ZPA service can provide a user with access to enterprise resources in lieu of traditional Virtual Private Networks (VPNs). Those of ordinary skill in the art will recognize various other types of cloud services are also contemplated. In fact, the trend is for all computing services to move to the cloud include, for example, document management, file storage, Customer Relationship Management (CRM), email, billing, finance, etc. In the context of these services, a provider of such cloud services can be referred to as a cloud provider, a SaaS provider, etc., and may utilize a hardware architecture similar to the cloud-based system 100. Of course, other types of cloud architectures are also contemplated.

Example Server Architecture

FIG. 2 is a block diagram of a server 200, which may be used in the cloud-based system 100, in other systems, or standalone. For example, the cloud nodes 102 and the central authority nodes 106 may be formed as one or more of the servers 200. The server 200 may be a digital computer that, in terms of hardware architecture, generally includes a processor 202, Input/Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Optimized Memory Model

Figure 3:
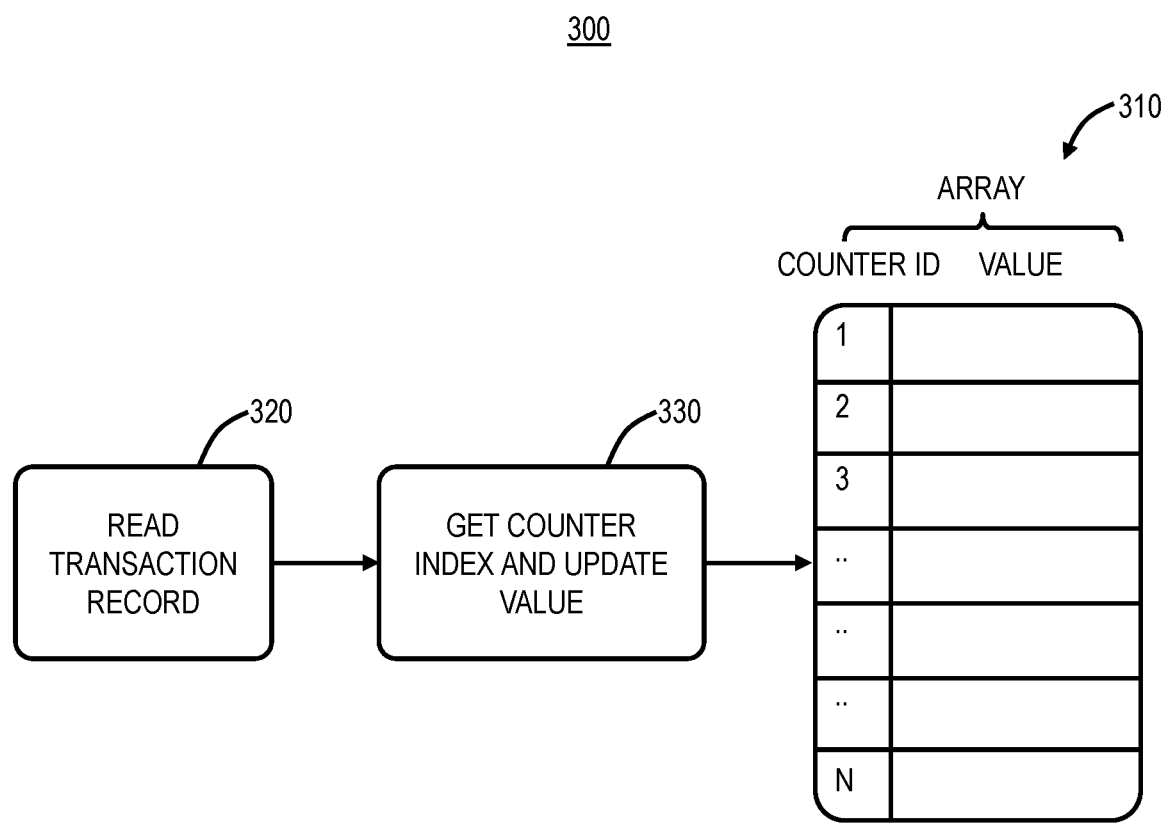
FIG. 3 is a block diagram of a memory model for statistic counters.

FIG. 3 is a block diagram of a memory model 300 for statistic counters. The memory model 300 can be used to maintain statistic counters for a plurality of users, such as users of the cloud-based system 100. Specifically, the memory model 300 can be implemented in physical memory, such as through the logging node 108, the server 200, the cloud nodes 102, etc. In an embodiment, the memory model 300 maintains the statistic counters in a fully uncompressed form in memory. Each active user is allocated memory that can accommodate all of a possible set of statistic counters in the memory model 300. The memory is held, for example, in the memory until a given time interval is reached (e.g., an hour boundary or the like) when the statistic counters are compressed and stored, for example, in the data store 208. The statistic counters can also remain in compressed form in memory, e.g., the memory 210, for fast reporting.

FIG. 3 illustrates a logical view of the steps to update counters. The statistic counters can be maintained in an array 310 in physical memory, e.g., in the memory 210. The array 310 can include a counter identifier (ID) and a value, i.e., a tuple. For a specific time period, a system such as the logging node 108 is configured to read transaction records (step 320) and get a counter index and update the values (step 330). For example, assume the logging node 108 implements the memory model 300. The logging node 108 processes a transaction record and translates expected fields into predefined counter IDs between 1 to N, N being the number of statistic counters. The logging node 108 updates the statistic counters by directly accessing the counter array 310 (indexed on the given counter ID).

Again, an example of statistic counters is described in commonly assigned U.S. Pat. No. 8,429,111. The statistic counters can include anything related to users of a cloud-based system 100. For example, the statistic counters for monitoring the status of the cloud-based system 100 can require several thousand variables ranging from hardware, peripheral, network, operating system, memory, process variables indicating errors, exceptions, and events such as virus-detection counts, and content classification counts. In other embodiments, the statistic counters could relate to Operations, Administration, Maintenance, and Provisioning (OAM&P) data; Performance Monitoring (PM); Fault, Configuration, Accounting, Performance, Security (FCAPS) data; and the like.

Commonly-assigned U.S. Pat. No. 9,760,283 notes that the number of statistic counters updated in a given interval is less than the maximum counters available in the memory model 300. For example, on existing production data for the cloud-based system 100, only 1299 out of 8000 possible counters were active in any given enterprise. Accordingly, the systems and methods provide optimization to the memory model 300, where a large set of sparse statistic counters are updated in a given interval with minimal requirements on the memory 210 and the processor 202.

Thus, commonly assigned U.S. Pat. No. 8,429,111 describes compression, and commonly-assigned U.S. Pat. No. 9,760,283 describes memory management for sparsely updated counters. The present disclosure provides additional optimization to further compress records based on an observation that a large amount of data is required to store counter ID, in the context of sparsely updated counters.

The following describes current compression techniques for a record to illustrate a large amount of data is required to store counter ID.

Compression Format for a Record

The compression format is a collection of counters. A counter in the compressed stream represents a group of opcodes (operational codes). A single opcode represents one or more of the following 1) value of the counter and 2) offset of the counter with respect to the previous non-zero counter. This compression technique follows the approach that there are a large number of counters for any given time period, but a vast majority of a large number of counters are either zero for that time period or simply unused for this enterprise (or user, etc.). Referring to the array 310, it is not necessary to store the counter ID, but rather an offset between counter IDs and the values.

The following describes an example where there are eight opcodes defined by 3 bits.

| Opcode | Total size (In bytes) | Optcode size (in bits) | Offset (size and range) | Value Size in bits(value range) |
|---|---|---|---|---|
| GCSV1 | 1 | 3 | (5 bit used and −16 to 15 ) | 0 bits (Value is 1) |
| GCSV2 | 1 | 3 | (5 bit used and −16 to 15 ) | 0 bits (Value is 2) |
| GCSV3 | 1 | 3 | (5 bit used and −16 to 15 ) | 0 bits (Value is 3) |
| GCSOV | 2 | 3 | (13 bit used and −4096 to 4095) | 0 (No value only offset) |
| GCSO1B | 2 | 3 | (5 bit used and −16 to 15 ) | 1 byte for value (−128 to 127) |
| GCSO2B | 3 | 3 | (5 bit used and −16 to 15 ) | 2 Bytes for value |
| GCSV04B | 5 | 3 | (5 bit used and −16 to 15 ) | 4 Bytes for value |
| GCSV08B | 9 | 3 | (5 bit used and −16 to 15 ) | 8 Bytes for value |

The different opcodes are used for different counters based on 1) how far the previous counter was located (offset) and 2) how large the value of the counter is. Specifically, in this example, the offset can be small with a value between −16 to 15 or large with a value between −4096 to 4095. Again, in this example, the offset value takes 5 bits for the small offset and 13 bits for the large offset. The value size varies from 0 bits to 8 bytes. In this example, the first four opcodes have no size for the value, rather the opcode itself indicates the value—either 1, 2, 3, or 0. The final four opcodes have a size of the value of 1, 2, 4, or 8 bytes.

Thus, in the example, each record is stored between 1-9 bytes is size. The opcode is 3 bits and determines the rest of the data in the record—how much offset and how much for the value. In the first three opcodes, the record is 1 byte with 3 bits for the opcode and 5 bits for the offset—there are no bits for the value as the opcode indicates the value—1, 2, or 3. The fourth opcode is 2 bytes with 3 bits for the opcode and 13 bits for the offset—there are no bits for the value as the opcode indicates the value of 0. The final four opcodes are 2, 3, 5, and 9 bytes, respectively, with 3 bits for the opcode, 5 bits for the offset, and the remaining bits for the value.

Those of ordinary skill in the art will recognize other embodiments are contemplated. The key aspect is storage of an opcode indicative of the record format and possible of the record value and an offset to indicate the offset. In this manner, only the non-zero counter records need to be stored.

The following is a sample uncompressed record where 6 counters are updated of a total of 10000 counters:

| counter ID | value |
|---|---|
| 48 | 10 |
| 49 | 100 |
| 296 | 20 |
| 297 | 200 |
| 5048 | 1 |
| 5059 | 300 |

The following is a sample compressed format of the above 6 counters utilizing the opcodes described herein:

| Row type | Value | offset | RecordType (size) |
|---|---|---|---|
| Offset | No value | 48 | GCS0V(2) |
| Value | 10 | 0 | GCS01B(2) |
| Value and Offset | 100 | 1 | GCS01B(2) |
| Offset | No value | 247( ) | GCS0V(2) |
| Value | 20 | 0 | GCS01B(2) |
| Value and Offset | 200 | 1 | GCS02B(3) |
| Offset | No value | 4095 | GCS0V(2) |
| Offset | No value | 656 | GCS0V(2) |
| Value | 1 | 0 | GCS1V(1) |
| Value and Offset | 300 | 1 | GCS02B(3) |

The total compressed size is 21 bytes (168 bits). Out of 168 bits, 30 bits are used for the record type, 82 bits are used for the offset values, and 56 bits are used for actual values. Accordingly, the offset is consuming around 49 percent of record size, a significant amount.

Rearrange Counter Locations

As described herein, the objective of the present disclosure is to reduce the space required to store the counter ID. The previous example describes a minimum of 5 bits for the offset in each and every opcode. The goal is to reduce this amount. The array 310 includes a large number of rows (counter IDs), e.g., tens of thousands of counters. As noted, there can be upwards of 8000 counter IDs, and there may only be 1200 or so used for any given enterprise. Even further, there may be a significantly smaller number used in any given time period.

To reduce the space used by the counter IDs, the present disclosure includes rearranging the counters in such a way that most frequently used counters occupy the lower counter ID and, at best, subsequent to one another. Variously, the present disclosure includes an automated framework to capture the most frequently used counters, for a given enterprise and/or user, and to utilize this data to reorder the counters cstat record. Advantageously, the space required to store the counter IDs is lower.

The counter IDs are used to determine what counter each record relates to. That is, there is a map of counter IDs to counter type. The previous example viewed this map as fixed and unchanging. The present disclosure contemplates changing the map of counter IDs so that they are closer together, i.e., to remove the sparsely updated aspect. In this manner, the offset is ideally one—i.e., the counters are adjacent to one another. This enables a reduction in the storage of the counter ID.

Various techniques can be used to update the map, such as monitoring historical usage and ordering the counter IDs based on which ones are used most frequently. For example, the most used counter ID can be counter ID 1, the second most can be counter ID 2, etc. This approach can be on a per enterprise basis. It is also possible to perform this on a per-user, per group of users, across enterprises, etc. In addition to historical usage, other techniques are also contemplated, such as machine learning, etc. For example, machine learning can provide insights into which counter IDs are correlated to one another and most frequently used together. The objective is to place counters that are most used together close to one another in terms of counter ID.

Another optimization is to store the differential between the subsequent updated counter ID instead of the full counter ID. Given the above rearrangement, the differential between subsequent IDs will be minimum and as low as 1. It would require less space (bytes) to store the differential than to store the full counter IDs.

Compression Format

This section describes an example of the underlying representation of a compressed cstat record. For example, a counter in the compressed stream is represented by the following fields:

| Record type | Counter ID offset | Counter value |
| --- | --- | --- |
| 3 bits (fixed) | 0-21 bits | 5-61 bits |

A record type is a mandatory field, and, with three bits, there can be a total of eight record types (represented by three bits).

Counter ID offset is now an optional field. In the case where the offset is 1, no space is allocated, and the record type indicates that the offset is 1. This is the ideal scenario enabled by the reordering of the counter IDs described above. Based on the counter ID rearrangement mentioned above, in a practical example, about 50% of the counters have a counter ID offset as 1. Remaining 5-61 bits are used for storing the counter value. In the case where the counter ID offset is greater than 1, [5-21] bits are allocated for the offset.

The counter value is represented by [5-61] bits depending on the value to be stored.

In an example and based on the above fields, the following opcodes can be defined for cstat compression:

| Record type | Size (In bytes) | Opcode size (in bits) | Offset (size and range) | Value or value range |
| --- | --- | --- | --- | --- |
| GCS5V | 1 | 3 | Default Offset value 1 | 5 bits for values |
| GCS13V | 2 | 3 | Default Offset value 1 | 13 bits values |
| GCS21V | 3 | 3 | Default Offset Value 1 | 21 bits values |
| GCS29V | 4 | 3 | Default Offset Value 1 | 29 bits values |
| GCSV61V | 8 | 3 | Default Offset Value 1 | 61 bits for values |
| GCSV50 | 1 | 3 | 5 bit for offset (1 to 32) | No value |
| GCSV130 | 2 | 3 | 13 bit for offset (1 to 8192) | No values |

-continued

| Record type | Size (In bytes) | Opcode size (in bits) | Offset (size and range) | Value or value range |
| --- | --- | --- | --- | --- |
| GCSV210 | 3 | 3 | 21 bit for offset (1 to 2097152) | No values |

The following is a sample uncompressed record where 6 counters are updated of a total of 10000 counters. The counter ID would be more compact because of the rearrangement of cstat counters described herein.

Uncompressed Table:

| counter id | value |
| --- | --- |
| 1 | 10 |
| 2 | 100 |
| 60 | 20 |
| 61 | 200 |
| 80 | 1 |
| 81 | 300 |

Compressed Format:

| Row type | Value | offset | RecordType (size) |
| --- | --- | --- | --- |
| Value | 10 | 1 (default offset) | GCS5V(1) |
| Value | 100 | (default offset) | GCS13V(2) |
| Offset | No value | 57 | GCSV130(2) |
| Value | 20 | 1 (default offset) | GCS5V(1) |
| Value | 200 | 1 (default offset) | GCS13V(2) |
| Offset | No Value | 18 | GCSV50(l) |
| Value | 1 | 1 (default offset) | GCS5V(1) |
| Value | 300 | 1 (default offset) | GCS13V(2) |

The total compressed size is 12 bytes (96 bits). Out of 96 bits, 24 bits are used for the record type, 18 bits are used for offset, and 54 bits are used for actual values. So the offset is consuming around 18 percent of record size, significantly less than the non-rearranged example.

Process for Efficiently Maintaining Records

Figure 4:
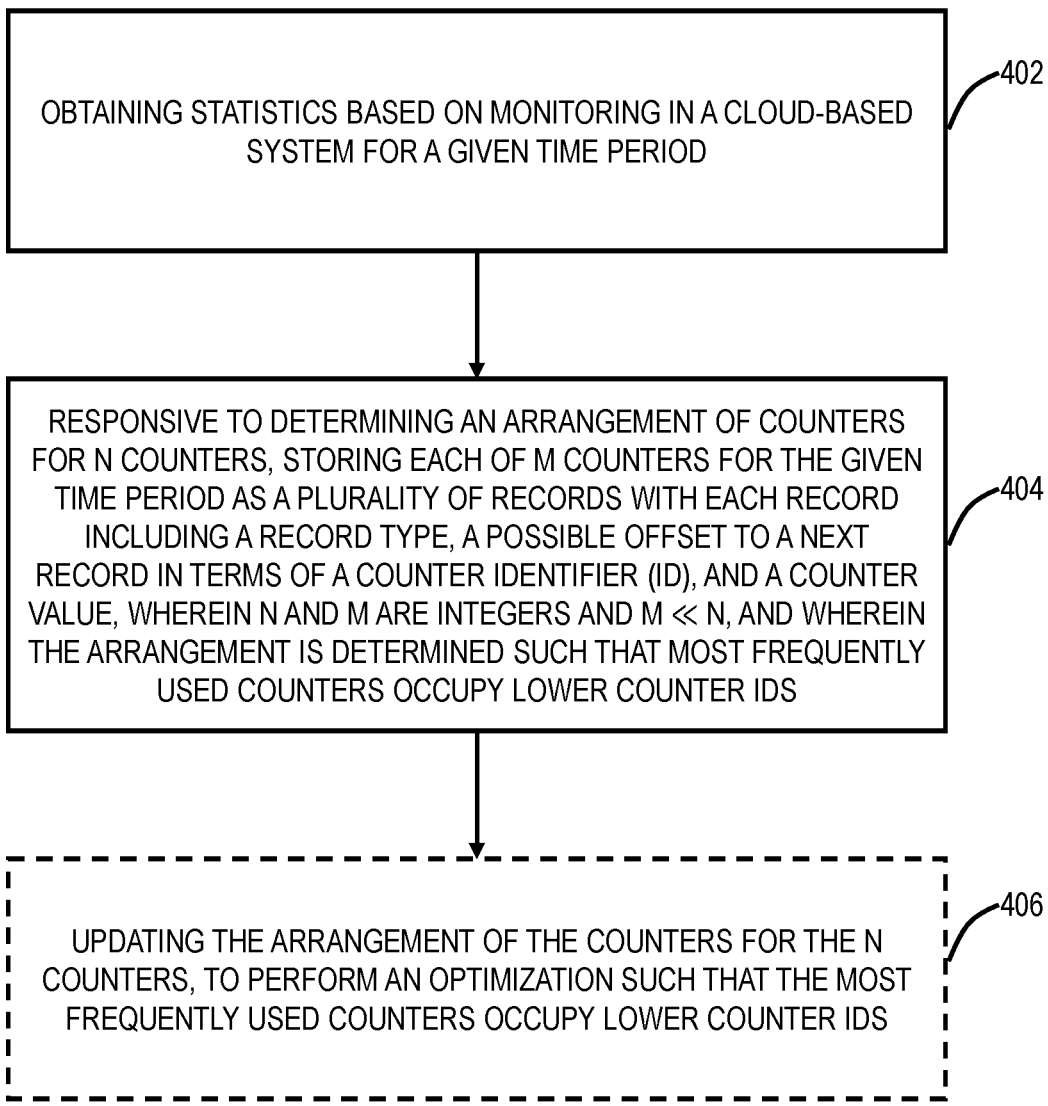
FIG. 4 is a flowchart of a process for efficiently maintaining records, based on monitoring in the cloud-based system and based on sparsely updated statistics.

FIG. 4 is a flowchart of a process 400 for efficiently maintaining records, based on monitoring in the cloud-based system 100 and based on sparsely updated statistics. The process 400 contemplates implementation as a computer-implemented method, as a computer-readable code stored in a non-transitory computer-readable storage medium, and via a server. The process 400 includes obtaining statistics based on monitoring in a cloud-based system for a given time period (step 402); and, responsive to determining an arrangement of counters for N counters, storing each of M counters for the given time period as a plurality of records with each record including a record type, a possible offset to a next record in terms of a counter identifier (ID), and a counter value, wherein N and M are integers and M<<N, and wherein the arrangement is determined such that most frequently used counters occupy lower counter IDs (step 404). The process 400 can further include updating the arrangement of the counters for the N counters, to perform an optimization such that the most frequently used counters occupy lower counter IDs (step 406). The updating can be based on historical data and machine learning.

The arrangement can be further determined such that counters in the N counters frequently used together are subsequent to one another. The possible offset can be omitted when a record has a counter ID subsequent to a previous record's counter ID. The record type can be a fixed value that determines a size and range of the possible offset and a value or value range of the counter value. The possible offset can be one of 1 or a value specified in bits of a record based on the record type. N can be on an order of tens of thousands, and M is several orders of magnitude less than N.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a processor to perform steps of:

monitoring a cloud-based system for a given time period for a given enterprise and/or user;

identifying statistics of any of the enterprise, user, and group of users based on the monitoring;

identifying, via a Machine Learning (ML) model, which counter Identifiers (IDs) are correlated to one another and most frequently used together, such that the ML model identifies an optimal arrangement of counters;

placing counters that are most used together close to one another in terms of counter ID based on the ML model;

responsive to determining an arrangement of counters for N counters, storing each of M counters for the given time period as a plurality of records with each record including a record type, a possible offset to a next record in terms of counter ID, and a counter value, wherein N and M are integers and M<<N, and wherein the arrangement is determined such that most frequently used counters occupy lower counter IDs, and wherein the storing is done for the given enterprise and/or user; and querying the arrangement of counters for the given enterprise and/or user, wherein the counters are sparsely populated and the arrangement of counters provides any of faster decompression rate, more of the counters stored in cache, and reduced storage space, each relative to another arrangement based on the counter IDs.

2. The non-transitory computer-readable storage medium of claim 1, further comprising
updating the arrangement of the counters for the N counters, to perform an optimization such that the most frequently used counters occupy lower counter IDs.

3. The non-transitory computer-readable storage medium of claim 2, wherein the updating is based on historical data and machine learning.

4. The non-transitory computer-readable storage medium of claim 1, wherein the arrangement is further determined such that counters in the N counters frequently used together are subsequent to one another.

5. The non-transitory computer-readable storage medium of claim 1, wherein the possible offset is omitted when a record has a counter ID subsequent to a previous record's counter ID.

6. The non-transitory computer-readable storage medium of claim 1, wherein the record type is a fixed value that determines a size and range of the possible offset and a value or value range of the counter value.

7. The non-transitory computer-readable storage medium of claim 1, wherein the possible offset is one of 1 or a value specified in bits of a record, based on the record type.

8. The non-transitory computer-readable storage medium of claim 1, wherein N is on an order of tens of thousands and M is several orders of magnitude less than N.

9. A server comprising:
a network interface communicatively coupled to a network;
a processor communicatively coupled to the network interface; and
memory storing computer-executable instructions that, when executed, cause the processor to
monitor a cloud-based system for a given time period for a given enterprise and/or user;
identify statistics of any of the enterprise, user, and group of users based on the monitoring;
identify, via a Machine Learning (ML) model, which counter Identifiers (IDs) are correlated to one another and most frequently used together, such that the ML model identifies an optimal arrangement of counters;

place counters that are most used together close to one another in terms of counter ID based on the ML model;

responsive to a determination of an arrangement of counters for N counters, store each of M counters for the given time period as a plurality of records with each record including a record type, a possible offset to a next record in terms of counter ID, and a counter value, wherein N and M are integers and M<<N, and wherein the arrangement is determined such that most frequently used counters occupy lower counter IDs, and wherein the storing is done for the given enterprise and/or user; and query the arrangement of counters for the given enterprise and/or user, wherein the counters are sparsely populated and the arrangement of counters provides any of faster decompression rate, more of the counters stored in cache, and reduced storage space, each relative to another arrangement based on the counter IDs.

10. The server of claim 9, wherein the computer-executable instructions that, when executed, further cause the processor to update the arrangement of the counters for the N counters, to perform an optimization such that the most frequently used counters occupy lower counter IDs.

11. The server of claim 10, wherein the updating is based on historical data and machine learning.

12. The server of claim 9, wherein the arrangement is further determined such that counters in the N counters frequently used together are subsequent to one another.

13. The server of claim 9, wherein the possible offset is omitted when a record has a counter ID subsequent to a previous record's counter ID.

14. The server of claim 9, wherein the record type is a fixed value that determines a size and range of the possible offset and a value or value range of the counter value.

15. The server of claim 9, wherein the possible offset is one of 1 or a value specified in bits of a record, based on the record type.

16. A method comprising:

monitoring a cloud-based system for a given time period for a given enterprise and/or user;

identifying statistics of any of the enterprise, user, and group of users based on the monitoring;

identifying, via a Machine Learning (ML) model, which counter Identifiers (IDs) are correlated to one another and most frequently used together, such that the ML model identifies an optimal arrangement of counters;

placing counters that are most used together close to one another in terms of counter ID based on the ML model;

responsive to determining an arrangement of counters for N counters, storing each of M counters for the given time period as a plurality of records with each record including a record type, a possible offset to a next record in terms of counter ID, and a counter value, wherein N and M are integers and M<<N, and wherein the arrangement is determined such that most frequently used counters occupy lower counter IDs, and wherein the storing is done for the given enterprise and/or user, and querying the arrangement of counters for the given enterprise and/or user, wherein the counters are sparsely populated and the arrangement of counters provides any of faster decompression rate, more of the counters stored in cache, and reduced storage space, each relative to another arrangement based on the counter IDs.

17. The method of claim 16, further comprising updating the arrangement of the counters for the N counters, to perform an optimization such that the most frequently used counters occupy lower counter IDs.

18. The method of claim 16, wherein the arrangement is further determined such that counters in the N counters frequently used together are subsequent to one another.

19. The method of claim 16, wherein the possible offset is omitted when a record has a counter ID subsequent to a previous record's counter ID.

20. The method of claim 16, wherein the record type is a fixed value that determines a size and range of the possible offset and a value or value range of the counter value, and wherein the possible offset is one of 1 or a value specified in bits of a record, based on the record type.

* * * * *